(12) United States Patent
Chamarajnager et al.

(10) Patent No.: US 11,706,237 B2
(45) Date of Patent: Jul. 18, 2023

(54) THREAT DETECTION AND SECURITY FOR EDGE DEVICES

(71) Applicant: VMware, Inc., Palo Alto, CA (US)

(72) Inventors: Ravishankar Chamarajnager, Atlanta, GA (US); Amit Vasant Patil, Pune (IN); Amol Khare, Pune (IN); Mandar Nadgouda, Pune (IN); Mahesh Kumar, Pune (IN); Gavin Lu, Beijing (CN); Tiejun Chen, Beijing (CN); Vasudev Yendapally, Alpharetta, GA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/509,289

(22) Filed: Oct. 25, 2021

(65) Prior Publication Data

US 2022/0046043 A1 Feb. 10, 2022

Related U.S. Application Data

(63) Continuation of application No. 16/250,354, filed on Jan. 17, 2019, now Pat. No. 11,184,375.

(51) Int. Cl.
*G06F 9/455* (2018.01)
*H04L 9/40* (2022.01)

(52) U.S. Cl.
CPC ...... *H04L 63/1425* (2013.01); *G06F 9/45558* (2013.01); *G06F 2009/45575* (2013.01); *G06F 2009/45595* (2013.01)

(58) Field of Classification Search
CPC .................................................. H04L 63/1425
USPC .............................................................. 718/1
See application file for complete search history.

(56) References Cited

U.S. PATENT DOCUMENTS

| 11,457,047 B2* | 9/2022 | Chander | G06F 9/45558 |
| 2004/0103412 A1* | 5/2004 | Rao | G06F 11/1433 |
| | | | 717/176 |
| 2013/0060524 A1* | 3/2013 | Liao | G05B 23/0254 |
| | | | 702/182 |
| 2013/0298243 A1* | 11/2013 | Kumar | H04L 67/10 |
| | | | 726/25 |
| 2017/0286670 A1* | 10/2017 | Artman | G06F 21/552 |

\* cited by examiner

*Primary Examiner* — Evral E Bodden
(74) *Attorney, Agent, or Firm* — Thomas Horstemeyer, LLP

(57) ABSTRACT

Disclosed are various examples for threat detection and security for edge devices in communication with Internet-of-Things (IoT) devices. In one example, a baseline behavior profile for a gateway virtual machine is transmitted from a management service to a gateway security process executed in a gateway device. The management service receives an anomaly notification including an indication of an anomaly from the baseline behavior profile. The managements service generates a user interface that shows a description of the anomaly.

20 Claims, 5 Drawing Sheets

THREAT DETECTION AND SECURITY FOR EDGE DEVICES

CROSS-REFERENCE TO RELATED APPLICATIONS

This Application claims priority to and the benefit of, and is a continuation of U.S. application Ser. No. 16/250,354, filed on Jan. 17, 2019, issued on Nov. 23, 2021 as U.S. Pat. No. 11,184,375, and entitled "THREAT DETECTION AND SECURITY FOR EDGE DEVICES," which is hereby incorporated herein by reference in its entirety.

BACKGROUND

Appliances, vehicles, sensors, controllers, actuators, and other devices can gather data and interact with the physical world. This network of devices or Internet-of-Things (IoT) can be utilized to improve operations and provide new services. In order to ensure the security and reliability of IoT device connections in an enterprise setting, the enterprise can utilize a management service capable of protecting IoT device data, as well as email, corporate documents, and other enterprise data from theft, data loss, and unauthorized access. In order to access a network, IoT devices can connect through a gateway or another edge device.

However, providing effective security solutions for IoT devices can be costly in time and effort in an enterprise environment that includes multiple edge devices. Edge devices can be in communication with multiple IoT devices. An edge device can include a number of processes that enable communication with the various IoT devices. Communications and processes related to IoT devices can pose a security risk. Including security features on the IoT device can affect is speed or other functionalities, and some IoT devices prioritize cost or functionality over security features. Some existing security options include anti-virus or anti-malware for devices that communicate with IoT devices. However, the existing security options lag behind threats because they can only mitigate threats that are known or predefined.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to threat detection and security for edge devices. Edge devices can be in communication with multiple Internet-of Things (IoT) devices. The edge devices can execute processes that enable communication with IoT devices. Communications and processes related to IoT devices can pose a security risk. Unlike existing technologies that define threats and monitor for these threats, the present disclosure defines verified acceptable behaviors and monitors to ensure no deviations or anomalies from the verified behaviors.

As described in further detail below, a security process can perform actions related to threat detection and security for a gateway device or another edge device. In some cases, the security process can be executed in a kernel mode or another privileged mode with respect to the gateway device. An association can be created between a profile and a virtual machine of the gateway device. The profile can include data describing expected behavior for the virtual machine. The expected behavior can include an expected data rate for the virtual machine. The virtual machine can be executed by a hypervisor of the gateway device. Actual behavior for the virtual machine can be determined. The actual behavior can include an actual data rate for the virtual machine. The actual data rate can be determined based at least in part on communications between the gateway device and an Internet of Things (IoT) device. A remedial action can be performed based on the anomaly between the actual behavior and expected behavior. In some cases, the security process can receive, from a management service, a command to permit the anomaly. An updated profile can be generated based on data describing the anomaly.

The remedial action can include one or more actions. The actions can include transmitting a notification to a management service, shutting down the virtual machine of the gateway device, disabling an interface, suspending the virtual machine of the gateway device, and transmitting a snapshot of the virtual machine to the management service. The remedial action can include permitting the anomaly and updating the profile.

The actual behavior can also include an actual network interface used by the virtual machine, a process executed by the virtual machine, and a hash of a particular process executed by the virtual machine. The actual network interface can be utilized for the communications between the gateway device and the IoT device. The profile can also include expected network interfaces, expected processes, and an expected hash of the particular process.

Figure 1:
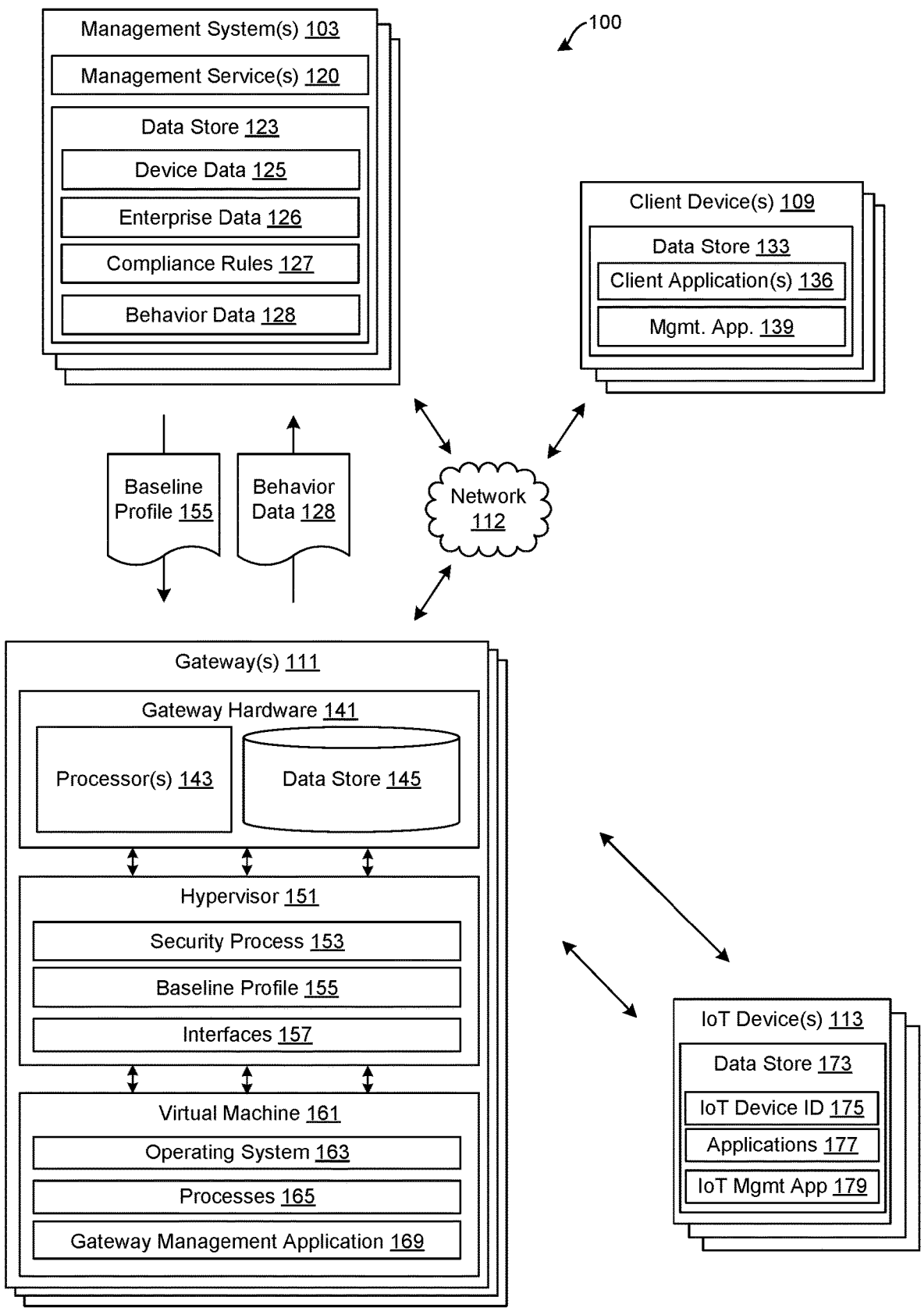
FIG. 1 is a drawing of an example of a networked environment, including a management system, a client device, a gateway, and IoT devices.

With reference to FIG. 1, shown is an example of a networked environment 100. The networked environment 100 can include a management system 103, a client device 109, a gateway 111, and Internet-of-Things (IoT) devices 113 in communication with one another over a network 112. Internet-of-Things (IoT) devices 113 and other devices can connect to the network 112 through the gateway 111. The gateway 111 can communicate with the management service 120 for management of the IoT devices 113 that connect to the network 112 through the gateway 111. The components of the networked environment 100 can be utilized for threat detection and security for the gateway 111 and other edge devices.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include a server computer or any other system providing computing capability.

While referred to in the singular, the management system 103 can include a plurality of computing devices that are arranged in one or more server banks, computer banks, or other arrangements. The management system 103 can include a grid computing resource or any other distributed computing arrangement. The management system 103 can be customer or enterprise-specific. In some embodiments, the management system can be part of a local network, and can be local to at least one of the other components of the networked environment. In other embodiments, the management system 103 can be remote from the other components, or the computing devices of the management system 103 can be located in a single installation or can be distributed among many different geographical locations local and/or remote from the other components. The management system 103 can also include or be operated as one or more virtualized computer instances. For purposes of convenience, the management system 103 is referred to herein in the singular. Even though the management system 103 is referred to in the singular, it is understood that a plurality of management systems 106 can be employed in the various arrangements as described above. The components executed on the management system 103 can include a management service 120 as well as other applications, services, processes, systems, engines, or functionality not discussed in detail herein. The management service 120 can be stored in the data store 123 of the management system 103.

The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash memory.

The data store 123 can include memory of the management system 103, mass storage resources of the management system 103, or any other storage resources on which data can be stored by the management system 103. The data stored in the data store 123 can include, for example, management data including device data 125, enterprise data 126, compliance rules 127, and IoT data, as well as other data.

The data stored in the data store 123 can be associated with the operation of the various applications and/or functional entities described. Client devices 109, gateways 111, and IoT devices 113 can be identified within the device data 125 by one or more of a device identifier, a unique device identifier (UDID), a media access control (MAC) address, an internet protocol (IP) address, or another identifier that uniquely identifies a device with respect to other devices. The device data 125 can include gateway data associated with gateways 111 and other edge systems or edge devices through which IoT devices 113 can connect to the network 112. The gateway data can also include specifications, and for each gateway 111, a type of gateway or a gateway identifier 156, and other information. Specifications for the gateway 111 can include hardware configurations including a chipset utilized by the gateway, a performance or capacity, a model identifier, and software configurations, including an agent application installed on the gateway 111. For example, the configuration can identify an agent such as the gateway enrollment agent 118, the gateway management application 169, or a version of the gateway enrollment agent 118 or the gateway management application 169. The gateway data can also include an organizational group.

Device data 125 can include data associated with a configuration of each client device 109, gateway 111, and IoT device 113, and can include an identifier of the client device 109, gateway 111, or IoT device 113. The identifier can be a serial number, media access control (MAC) address, other network address, or another device identifier. In addition, the device data 125 can include an enrollment status indicating whether each client device 109, gateway 111, or IoT device 113 is enrolled with or managed by the management service 120. A client device 109, gateway 111, or IoT device 113 designated as "enrolled" can be permitted to access the enterprise data 126, while a client device 109, gateway 111, or IoT device 113 designated as "not enrolled," or having no designation, can be denied access to the enterprise data 126.

Additionally, device data 125 can include indications of the state of devices including the client devices 109, gateways 111, and IoT devices 113. For instance, these indications can specify applications that are installed on the client devices 109, gateways 111, and IoT devices 113; configurations or settings that are applied to each of the devices, user accounts 137, gateway accounts, or service accounts associated with each of the devices; the physical locations of each of the devices; the network to which each of the devices is connected; and other information describing the current state of each of the devices. While a user account 137 can be associated with a particular person, in some cases a user account 137 can be unassociated with any particular person and can nevertheless be utilized for client devices 109, gateways 111, or IoT devices 113 that provide certain functionalities, such as automatic functionalities. For example, a gateway 111 can be associated with a service account or a gateway account that is unassociated with any person.

Device data 125 can also include data pertaining to user groups. An administrator can specify one or more of the client devices 109, gateways 111, and IoT devices 113 as belonging to a user group. The user group can refer to a group of user accounts 137, which can include gateway accounts. User groups can be created by an administrator of the management service 120 such that a batch of client devices 109, gateways 111, and/or IoT devices 113 can be configured according to common settings. For instance, an enterprise can create a user group for the marketing department and the sales department, where client devices 109, gateways 111, and/or IoT devices 113 in the marketing department are configured differently from the client devices 109, gateways 111, and/or IoT devices 113 in the sales department. Device data 125 associated with a gateway account can be referred to as gateway data.

Compliance rules 127 can include, for example, configurable criteria that must be satisfied for an enrolled one of the client devices 109, gateways 111, and IoT devices 113 to be in compliance with the management service 120. The compliance rules 127 can be based on a number of factors, including geographical location, activation status, enrollment status, and authentication data including authentication data obtained by a device registration system, time, and date, and network properties, among other factors associated with each device. The compliance rules can also be determined based on a user account 137 associated with a user. In some cases, a gateway 111 can be unassociated with a user, but can nevertheless be associated with a service account, a gateway account, or another user account 137 that is unassociated with a user.

Compliance rules 127 can include predefined constraints that must be met in order for the management service 120, or other applications, to permit access to the enterprise data 126 or features of the gateway 111. The management service 120 can communicate with gateway management application 169 such as a gateway enrollment agent 118, gateway management application 169, or other applications to determine whether states exist on the client device 109, gateway 111, or IoT devices 113 that do not satisfy one or more compliance rules 127. States can include, for example, a virus or malware being detected on the device; violation of a baseline or verified behavior profile; installation or execution of a blacklisted application; and a device being "rooted" or "jailbroken," where root access is provided to a user of the device. Additional states can include the presence of particular files, questionable device configurations, vulnerable versions of applications, vulnerable states of IoT devices 113 including violation of a baseline or verified behavior profile, or other vulnerability, as can be appreciated.

Behavior data 128 can be received from the gateway 111 through the security process 153. The behavior data 128 can include process behavior data and network data. Process behavior data for a virtual machine of the gateway 111 can include a process list, and, for each process 165, command lines utilized, network endpoints accessed, signatures utilized, publisher, and a hash of the process 165. The process behavior data can also be filtered or organized according to IoT device 113. For example, each of these types of data can be generated or filtered for a particular IoT device 113. Each of these types of data can be generated or filtered for a particular process.

Network behavior data can include, for a virtual machine of the gateway 111, an interfaces list, a count of interfaces, a number or count of adapters, a list of the adapter names or titles, a quantity of data transferred, and a list of network addresses or destinations. Network behavior data can be organized or filtered according to an associated IoT device 113, or a device identifier of the IoT device 113. For example, network behavior data for an IoT device 113 can be generated to include an interfaces list for an IoT device 113, a number or count of the interfaces, a number or count of adapters, a list of the adapter names or titles, a quantity of data transferred, a data transfer rate, and a list of network addresses or destinations. Alternatively, network behavior data can be organized or filtered according to each interface in the interfaces list. Network behavior data for a particular interface can be generated to include a number or count of adapters, a list of the adapter names, a quantity of data transferred, and a list of network addresses. The interfaces can be categorized by type. The quantity of data transferred can by a quantity of bits, bytes, megabytes, or another measure of data quantity. A list of IoT devices 113 can also be determined based on network behavior data and process behavior data that reference or specify an IoT device 113 identifier.

The management service 120 can oversee the management of devices including the client devices 109, gateways 111, and IoT devices 113. The management service 120 can oversee security and threat detection for the gateways 111 and the IoT devices 113. The management service 120 can provide functionality using application program interfaces (APIs). To this end, an API of the management service 120 can provide enrollment information regarding a device, such as whether the device is enrolled with the management service 120. APIs or API calls can be provided for other functionalities of the management service 120 as discussed herein. The management service 120 can generate and provide an administrative console or user interface for management of the gateway 111, other edge devices, and IoT devices 113 that are connected through the edge devices. The user interface of the management service 120 can be accessed through client management application 139 or another application of a client device 109, or can be accessed through a network site provided by the management service 120 or the management service 120. The management service 120 can provide a user interface for setting and viewing alerts and notifications for anomalies in behaviors of a gateway 111 in communications with IoT devices 113. The alerts and notifications can also be sent to an email address or to a client device 109.

The management service 120 can receive the behavior data 128 from the security process 153 of the gateway 111. The management service 120 can collect and learn the behaviors associated with a particular virtual machine for a threshold period of time and generate a baseline profile 155 for the virtual machine. The baseline profile 155 can include all of the behaviors of the virtual machine from the behavior data 128, or a subset of the behaviors of the virtual machine that are verified to be acceptable. The management service 120 can generate a user interface that describes behaviors from the behavior data 128, which can be rendered on a display of the management system 103 or a client device 109. An administrator or other user can verify or accept all or a subset of the behaviors. The management service 120 can generate a baseline profile 155 for the virtual machine based on the behavior data 128 that is verified. The management service 120 can transmit the baseline profile 155 to the gateway 111. In some examples, the baseline profile 155 can apply to a virtual machine of a particular type. Because the processes and types of IoT devices 113 of a virtual machine can be similar, the baseline profile 155 can be utilized for all gateways 111 that are running that type of virtual machine.

The management service 120 can include a message broker for onboarding and configuration of gateway devices 111 and other edge devices, as well as IoT devices 113. The message broker can utilize Message Queuing Telemetry Transport (MQTT) or another publish-subscribe-based messaging protocol, Advanced Message Queuing Protocol (AMQP), or another messaging protocol. The management service 120 can also include an analytics service that provides real-time infrastructure analytics for the gateway 111, other edge devices, and IoT devices 113. The analytics can be generated based on IoT data provided from the gateway 111 or other edge devices.

The IoT data can include a stream of at least one tuple including a number and a time stamp. The IoT data can include a sampling function which is a user defined method (udm), a sampling frequency stating the interval between subsequent executions of the udm, and an aggregation count stating how many executions of the udm to aggregate before sending the IoT data, for example, to the management service 120. The IoT data can include SI units and a prefix that identifies what the numbers of the stream of IoT data represent. A user interface can be generated based at least in part on the IoT data. The gateway 111 can provide IoT data to the management service 120 based on IoT device 113 communications with the gateway 111. The gateway 111 can also provide behavior data 128 that is based on IoT data and data transfer between the gateway 111 and the IoT devices 113.

The management service 120 can also request that the gateway 111, client device 109, or IoT device 113 check-in using a notification service like APPLE® Push Notification Service (APNS), GOOGLE® Cloud Messaging (GCM), WINDOWS® Push Notification Services (WNS), or Air-Watch® Cloud Messaging (AWCM). For example, the management service 120 can transmit a request to the notification service, which requests that the gateway 111 check-in with the management service 120. The notification service can push or otherwise route a notification to the gateway 111. Once the notification is received, the gateway management application 169 can cause the gateway 111 to check-in with the management service 120. The gateway management application 169 can determine whether a command queue provided by the management service 120 for the respective gateway 111 contains any commands or resources for the gateway 111, and, if so, can cause the commands or resources to be downloaded and/or implemented on the gateway 111. A client device 109 can likewise be associated with a command queue and can retrieve and implement commands in response to a request from a notification service.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system that can perform functionalities and execute applications. The operating system can be stored in a data store 145 that also includes applications 136, a client management application 139, and other data. The client device 109 can execute the client management application 139 to perform or access the functionality described for the management service 120.

The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine or a kiosk that is not easily portable.

The operating system of the client device 109 can be configured to execute various applications 136, such as a client management application 139, a browser application, or another application. The operating system and some applications 136 can access network content served up by the management system 103, or other servers, thereby rendering a user interface on a display, such as a liquid crystal display (LCD), organic light emitting diode (OLED) display, touch-screen display, or other type of display device.

To this end, some applications 136 can include a browser or a dedicated application, and a user interface can include a network page, an application screen, or other interface. The client device 109 can also access web applications using the browser application. Further, other applications 136 can include device management applications, enterprise applications, social networking applications, word processors, spreadsheet applications, media player applications, or other applications. The client management application 139 can be an application that performs certain functions in the enrollment of the gateway 111 with the management service 120. The client management application 139 can perform actions as directed by the management service 120, for instance, by checking in with the management service 120, retrieving a command from the command queue, and implementing the command as discussed above.

The gateway 111 can provide network 112 access to the IoT devices 113 as well as gather IoT data based on IoT device 113 communications with the gateway 111. While referred to as a gateway, the gateway 111 can also be representative of routing switches, integrated access devices (IADs), multiplexers, a variety of metropolitan area network (MAN) and wide area network (WAN) access devices, and other edge devices. The gateway 111 can include gateway hardware 141 that includes processor(s) 143 and data store(s) 145. The gateway 111 can include a hypervisor 151. The hypervisor 151 can have components including a security process 153 and other processes or applications that are installed in, and execute from, the hypervisor 151. In some cases, the hypervisor 151 and its components can execute in a kernel mode or another privileged mode with respect to the gateway hardware 141 of the gateway 111. The security process 153 can also be separate from the hypervisor 151, but can be executed in a kernel mode or another privileged mode. The data store 145 can store the security process 153 and the baseline profile 155, as well as a virtual machine 161, an operating system 163, processes 165, interfaces 167, and gateway management application 169.

The hypervisor 151 can be a bare metal or native hypervisor that has direct access to the gateway hardware 141. In other cases, the hypervisor 151 can be a hosted hypervisor that is installed and executed as an application in a host operating system. The hypervisor 151 can execute the virtual machine 161 of the gateway 111. The hypervisor 151 can execute one or more virtual machine 161. The hypervisor 151 can snapshot, suspend, quarantine, resume, power on, and power off the virtual machine 161. The interfaces 157 can refer to network interfaces for the gateway 111. The interfaces 157 can be interfaces created in the hypervisor, and can include a media access control (MAC) address, a port group, a maximum transmission unit (MTU) setting, and an interface identifier. The interfaces 157 can provide access to network hardware of the gateway hardware 141.

The virtual machine 161 can access the gateway hardware 141 through the hypervisor 151 and virtualize or emulate a computer system of the gateway 111. The virtual machine 161 can execute an operating system 163 and processes 165. The operating system 163 can be an operating system of the gateway 111. The processes 165 can be processes or applications that enable communication with a particular IoT device 113, aggregate IoT data, and provide additional functionalities of the gateway 111.

The security process 153 can receive a baseline profile 155 from the management service 120. The security process 153 can establish the baseline profile 155 for the virtual machine 161 by creating an association between the baseline profile 155 and the virtual machine 161. Once the baseline profile 155 is associated with the virtual machine 161, the security process 153 can monitor the processes 165 and network communications of the gateway 111. For example, as a component installed in the hypervisor 151, the security process 153 can have access to network communications of the gateway 111, as well as the processes 165 of the virtual machine 161. Also, where the hypervisor 151 is a native hypervisor in a privileged mode, the security process 153 can also be in a privileged mode. This can prevent alteration of the security process 153, as user mode code and processes can be prevented from access to the privileged mode memory location of the security process 153.

The security process 153 can collect and learn the behaviors associated with a particular virtual machine 161 for a threshold period of time and generate a baseline profile 155 for the virtual machine. In these cases, the security process 153 can store the behavior data 128 in the data store 145 rather than forward or transmit the behavior data 128 to the management service 120 for analysis. In some examples, the security process 153 can generate a baseline profile 155 for the virtual machine based on the behavior data 128 rather than receiving it from the management service 120.

The security process 153 can monitor the virtual machine 161 operational behavior, including process behaviors and network behaviors. These behaviors can be compared to the baseline profile 155 for the virtual machine of the gateway 111. For example, the security process 153 can perform a process analysis that compares actual process behaviors from the behavior data 128 to expected process behaviors from the baseline profile 155.

The process analysis can determine an anomaly by comparing a list of actual processes 165 to a list of expected processes 165 from the baseline profile 155. The process analysis can determine an anomaly by comparing an actual command line or an actual command line interface (CLI) argument for a particular process 165 to a list of expected command lines or CLI arguments for the process 165. The process analysis can determine an anomaly by comparing an actual directory address of a particular process 165 to an expected directory address for the process 165. The process analysis can determine an anomaly by comparing an actual signature for a particular process 165 to an expected signature for the process 165, or an actual publisher for the particular process 165 to an expected publisher for the process 165.

The process analysis can determine an anomaly by comparing an actual hash of a particular process to an expected hash of the process. The security process 153 can generate a hash of the actual process 165 by inputting code of the process 165 into a hash function such as a secure hash algorithm (SHA) to output the actual process hash. The hash function can be MD5, SHA-1, SHA-2, SHA-3, BLAKE2, or another cryptographic hash function. The security process 153 can compare the actual process hash to an expected process hash from the baseline profile 155. An anomaly in the hash can indicate that the code or content of the process 165 differs from the verified version of the process 165 from the baseline profile 155.

The security process 153 can determine whether an IoT device 113 is compromised based on the process analysis. For example, an anomaly can be determined with respect to a particular process 165, and the particular process 165 can be associated with the IoT device 113. The particular process 165 can be a program that is used to communicate with the IoT device 113, or to aggregate or interpret IoT data from the IoT device 113. The security process 153 can access a table or record that associates the process 165 with the IoT device 113 to identify the association. The baseline profile 155 can include data that associates each process 165 with one or more IoT device 113 according to IoT device identifier.

The security process 153 can also perform a network analysis of the virtual machine. The network analysis can determine an anomaly by comparing a list of actual interfaces 157 accessed by the virtual machine 161 to a list of expected interfaces 157 from the baseline profile 155. The network analysis can determine an anomaly by comparing an actual destination network address to a list of expected actual destination network addresses from the baseline profile 155. The actual and expected destination network addresses can be compared according to process 165, interface 157, or virtual machine 161. The network analysis can determine an anomaly by comparing an actual adapter to a list of expected adapters from the baseline profile 155. The actual and expected adapters can be compared according to process 165, interface 157, or virtual machine 161.

Security process 153 can also perform actions in response to anomalies that are detected. In some cases, the security process 153 can perform the actions directly. While described as performed by the security process 153, the security process 153 can also cause the actions to be performed by the hypervisor 151.

The network analysis can determine an anomaly by comparing an actual data transfer rate to an expected data transfer rate from the baseline profile 155. The actual and expected data transfer rates can be associated with a particular network interface, a particular process 165, a particular IoT device 113, a type of IoT device 113, or a total data transfer rate for the virtual machine 161. An average data transfer rate for a group of IoT devices 113, for example, of a particular type can also be compared. The data transfer rate can be calculated based on a particular period of time, for example, total data transferred per second, minute, ten minute period, hour, day, month, or any period of time.

The gateway management application 169 can perform management functionalities including enrollment functionalities, product and application installations, and profile installations. These functionalities can include a number of modules or components that perform actions through the gateway 111, and the gateway management instructions can be updated, upgraded, or otherwise altered throughout the lifecycle of the gateway 111. The gateway management application 169 can include a number of components including an IoT Agent for management and communication with IoT devices 113. The IoT Agent can include a software development kit (SDK) for gateway 111 communications with IoT devices 113. The SDK can include libraries for applications including processes 165 that connect and orchestrate data and control between IoT devices 113, gateways 111, and other network locations. The gateway management application 169 can include an IoT agent for management and communication with IoT devices 113. The gateway management application 169 can perform the functionality described for the management service 120, for instance, by checking in, retrieving a command from the command queue, and implementing the command as discussed above.

The IoT devices 113 can be appliances, vehicles, sensors, controllers, actuators, and other physical devices including at least: a processor, network communication hardware, and a memory including executable instructions for communicating with a gateway 111. The IoT device 113 can be representative of one or more IoT devices 113. The IoT device 113 can include appliances, vehicles, sensors, controllers, actuators, monitors, phones, tablets, thermostats, speakers, and other devices and can incorporate processor-based systems, such as a computer system or any other device with like capability. The IoT device 113 can have an operating system or other software that can perform functionalities and execute applications 177. The operating system can be stored in a data store 173 that also includes applications 177, an IoT management application 179, and other data. The IoT device 113 can execute the IoT management application 179 to perform or access the functionality described for the management service 120. The IoT device 113 can also be equipped with networking capability or networking interfaces, including a localized networking or communication capability, such as a near-field communication (NFC) capability, radio-frequency identification (RFID) read or write capability, or other localized communication capability. In some embodiments, the IoT device 113 is mobile where the IoT device 113 is easily portable from one location to another. In other situations, the IoT device 113 can be a thermostat, fixture, or other device that is not easily portable.

The IoT management application 179 can perform actions as directed by the management service 120 and/or the gateway 111. The gateway management application 169 and/or the management service 120 can maintain a command queue for the IoT device 113. The command queue for the IoT device 113 can include actions and commands as discussed. The gateway management application 169 can determine whether states exist on the IoT device 113 that violate one or more of the compliance rules 127 based on status data received from the IoT device 113, or pass status data received from the IoT device 113 to the management service 120 to perform the evaluation. If the IoT device 113 is not in compliance, the gateway management application 169 or the management service 120 can place a command to bring the IoT device 113 into compliance in a command queue for the IoT device 113. The IoT management application 179 can retrieve the command to bring the IoT device 113 into compliance. The IoT management application 179 can implement the command. The management service 120 can place a command for the IoT device 113 in the command queue for the gateway 111. The gateway management application 169 can retrieve the command and place it in a command queue for the IoT device 113 that is maintained on the gateway 111.

Figure 2:
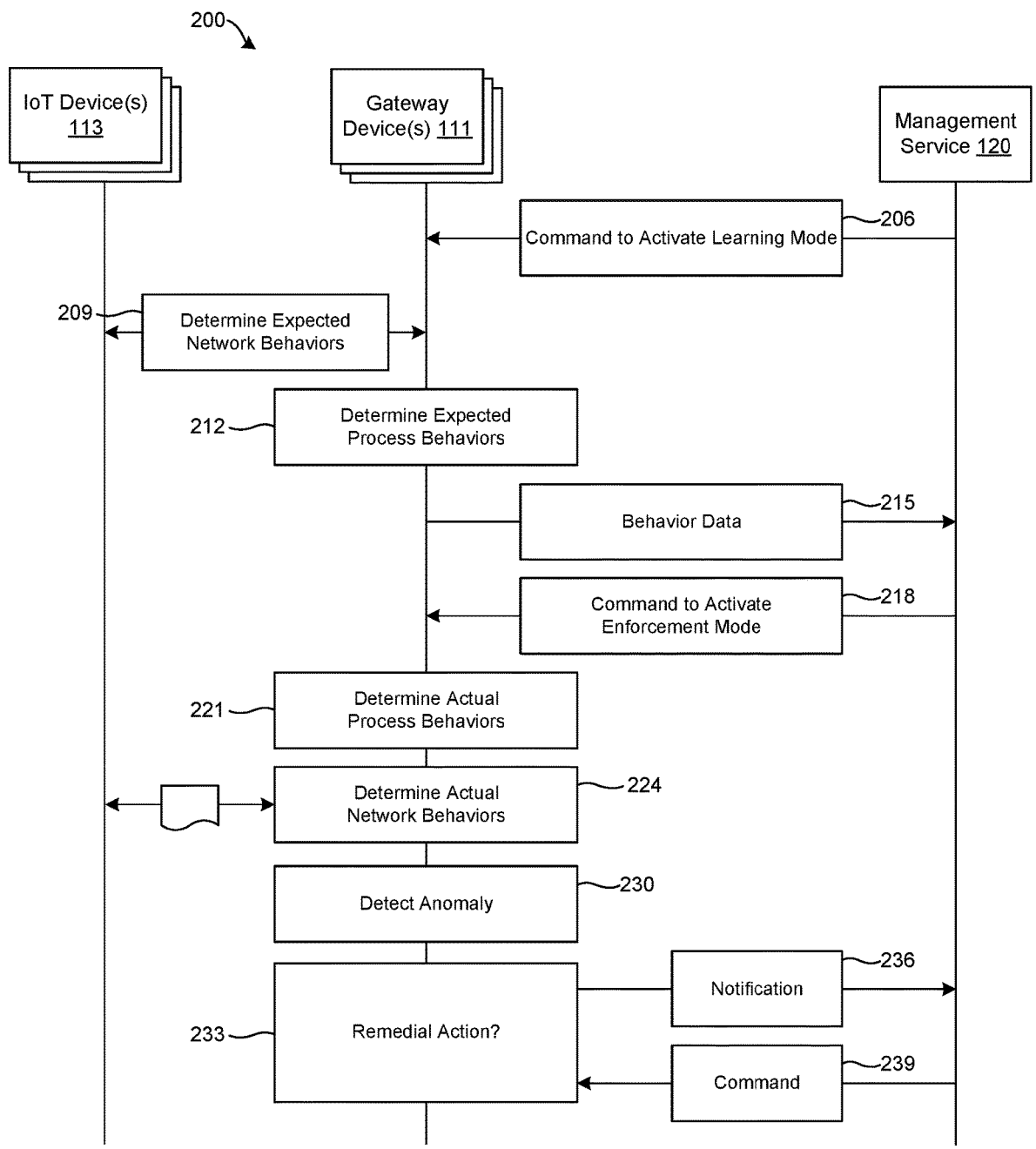
FIG. 2 is an example sequence diagram illustrating functionality implemented by components of the networked environment.

In FIG. 2, shown is an example sequence diagram 200 describing steps that can be performed by the components of the networked environment 100. Generally, the sequence diagram 200 describes how the components determine and enforce acceptable behaviors of a gateway 111 in communication with IoT devices 113.

In step 206, the management service 120 can transmit a command to activate learning mode to the gateway 111. The gateway management application 169 or the security process 153 can receive the command to activate learning mode. If the gateway management application 169 receives the command, it can cause the security process 153 to activate learning mode. If the security process 153 receives the command, it can activate its learning mode to learn virtual machine 161 behaviors. The command can include a threshold period of time to activate a learning mode, after which the learning mode can be completed. Alternatively, learning mode can be activated until a command to initiate an enforcement mode is received.

In step 209, the security process 153 can determine expected network behaviors based on virtual machine 161 behavior during the learning mode. The security process 153 can determine expected network behaviors based on the data transferred to and from the gateway 111 and related metadata. This can include intercepting or identifying data transferred to and from the gateway 111. The security process 153 can determine an expected data rate based on the transferred data. Multiple expected data rates can be determined. For example, an expected data rate can be determined for each process 165, each interface 157, and each IoT device 113. The security process 153 can also determine a list of IoT devices 113 based on IoT device 113 identifiers from the IoT data transferred to and from the gateway 111. The security process 153 can determine a list of interfaces 157 utilized by the virtual machine 161. The list of interfaces 157 can also be determined according to a process 165 that utilizes the list of interfaces 157. The security process 153 can intercept data transferred from the gateway 111 to identify the list of interfaces 157. The security process 153 can generate a portion of the behavior data 128 based on the network behaviors. The security process 153 can store the behavior data 128 and transmit it periodically to the management service 120. Alternatively, the security process 153 can stream the behavior data 128 to the management service 120 as it is intercepted or identified.

In step 212, the security process 153 can determine expected process behaviors based on virtual machine 161 behavior during the learning mode. While expected behavior data 128 is discussed as being based on behaviors of the virtual machine 161, the behavior data 128 can be determined based on any virtual machine of the same type as the virtual machine 161. The security process 153 can determine process behaviors based on an examination of the virtual machine 161 and the processes 165 executed by the virtual machine 161. The process behaviors can also be filtered or organized according to IoT device 113. For example, expected process behaviors for an IoT device 113 can include a list of processes 165 and a count of the processes 165. For each process 165, process behaviors can include command lines utilized, network endpoints accessed, signatures utilized, publishers, and a hash of each process. The security process 153 can determine process behaviors according to virtual machine 161 or according to an associated IoT device 113. The security process 153 can generate a portion of the behavior data 128 based on the process behaviors. The security process 153 can store the behavior data 128 and transmit it periodically to the management service 120. Alternatively, the security process 153 can stream the behavior data 128 to the management service 120 as it is intercepted or identified.

In step 215, the security process 153 can transmit the behavior data 128 to the management service 120. In some cases, the behavior data 128 can be communicated to the gateway management application 169, and the gateway management application 169 can transmit the behavior data 128 to the management service 120. Alternatively, the security process 153 can save the behavior data 128 to the data store 145. The behavior data 128 can include process behavior data and network data. Process behavior data for an IoT device 113 can be generated to include a list of processes associated with the IoT device 113, a count of the processes 165, command lines utilized, network endpoints accessed, signatures utilized, publishers, and a hash of each process associated with the IoT device 113. Process behavior data for a particular process can be generated to include command lines utilized, network endpoints accessed, signatures utilized, publishers, and a hash of the process 165. Network behavior data can include an interfaces list, a count of interfaces, a number or count of adapters, a list of the adapter names or titles, a quantity of data transferred, and a list of network addresses or destinations.

In step 218, the management service 120 can transmit, to the gateway device 111, a command to activate an enforcement mode. The command to activate the enforcement mode can include a baseline profile 155. The command can be transmitted to the gateway management application 169 or the security process 153 of the gateway 111. The management service 120 can generate the baseline profile 155 based on the behavior data 128 transmitted to the management service 120 during the learning mode. The baseline profile 155 can include all of the behaviors of the virtual machine 161 from the behavior data 128, or a subset of the behaviors of the virtual machine 161 that are verified to be acceptable. The management service 120 can generate a user interface that describes behaviors from the behavior data 128, which can be rendered on a display of the management system 103 or a client device 109. An administrator or other user can review the information in the user interface and verify all or a subset of the behaviors as acceptable. The management service 120 can generate a baseline profile 155 for the virtual machine 161 based on the behavior data 128 that is verified. The management service 120 can transmit the baseline profile 155 to the gateway 111 in response to the verification. The management service 120 can also transmit the baseline profile 155 to a group of virtual machines that have a same type as the virtual machine from which they were generated.

In step 221, the security process 153 can determine actual process behaviors for the virtual machine 161. The security process 153 can also determine actual process behaviors based on virtual machine 161 behavior during the enforcement mode. The security process 153 can determine actual process behaviors based on an examination of the virtual machine 161 and the processes 165 executed by the virtual machine 161. Actual process behaviors for an IoT device 113 can include a list of processes 165 and a count of the processes 165. For each process 165, process behaviors can include command lines utilized, network endpoints accessed, signatures utilized, publishers, and a hash of each process.

In step 224, the security process 153 can determine actual network behaviors based on the data transferred to and from the gateway 111 and related metadata. This can include intercepting or identifying data transferred to and from the gateway 111. The security process 153 can determine an actual data rate based on the transferred data. Multiple actual data rates can be determined. For example, an actual data rate can be determined for each process 165, each interface 157, and each IoT device 113. The security process 153 can also determine a list of IoT devices 113 based on IoT device 113 identifiers from the IoT data transferred to and from the gateway 111. The security process 153 can determine a list of interfaces 157 utilized by the virtual machine 161. The list of interfaces 157 can also be determined according to a process 165 that utilizes the list of interfaces 157. The security process 153 can intercept data transferred from the gateway 111 to identify the list of interfaces 157.

In step 230, security process 153 can detect an anomaly between the baseline profile 155 and the operational behavior of the virtual machine 161. The operational behavior can include the actual process behaviors for the virtual machine 161 and the actual network behaviors for the virtual machine 161. An anomaly can be based on any deviation identified from a comparison between the baseline profile 155 and the operational behaviors of the virtual machine 161.

For example, the security process 153 can monitor the virtual machine 161 operational behavior, including process behaviors and network behaviors. These behaviors can be compared to the baseline profile 155 for the virtual machine of the gateway 111. The security process 153 can perform a process analysis that compares actual process behaviors from the behavior data 128 to expected process behaviors from the baseline profile 155.

The process analysis can determine an anomaly by comparing a list of actual processes 165 to a list of expected processes 165 from the baseline profile 155; an actual command line interface (CLI) argument for a particular process 165 to a list of expected command lines or CLI arguments for the process 165; an actual directory address of a particular process 165 to an expected directory address for the process 165; an actual signature for a particular process 165 to an expected signature for the process 165; or an actual publisher for the particular process 165 to an expected publisher for the process 165.

The process analysis can also determine an anomaly by comparing an actual hash of a particular process to an expected hash of the process. The security process 153 can generate a hash of the actual process 165 by inputting the process 165 into a hash cryptographic function. The security process 153 can compare the actual process hash from the monitored operational behavior of the virtual machine 161 to an expected process hash from the baseline profile 155. An anomaly in the hash can indicate that the code or content of the process 165 differs from the verified version of the process 165 from the baseline profile 155.

The security process 153 can also perform a network analysis of the virtual machine 161. The network analysis can determine an anomaly by comparing a list of actual interfaces 157 accessed by the virtual machine 161 to a list of expected interfaces 157 from the baseline profile 155. The network analysis can determine an anomaly by comparing an actual destination network address to a list of expected actual destination network addresses from the baseline profile 155. The actual and expected destination network addresses can be compared according to process 165, interface 157, or virtual machine 161. The network analysis can determine an anomaly by comparing an actual adapter to a list of expected adapters from the baseline profile 155. The actual and expected adapters can be compared according to process 165, interface 157, or virtual machine 161.

The network analysis can also determine an anomaly by comparing an actual data transfer rate to an expected data transfer rate from the baseline profile 155. The actual and expected data transfer rates can be associated with a particular network interface, a particular process 165, a particular IoT device 113, a type of IoT device 113, or a total data transfer rate for the virtual machine 161.

In step 233, the security process 153 can perform a remedial action based on the anomaly. The remedial action can include one or more actions. The actions can include transmitting a notification to a management service, shutting down the virtual machine of the gateway device, disabling an interface, suspending the virtual machine of the gateway device, and transmitting a snapshot of the virtual machine to the management service. The remedial action can be associated with a category or subcategory of the anomaly. The categories and subcategories of the anomalies can be determined according to category and subcategory of the behavior data associated with the anomaly. For example, an anomaly between actual and expected network behavior can be a first category of anomaly. An anomaly between actual and expected process behavior can be a second category of anomaly. Further, an anomaly in a data rate for the virtual machine 161 can be a first subcategory of the network behavior category, while an anomaly in a data rate for a particular process 165 can be a second subcategory of the network behavior category.

In step 236, the security process 153 can transmit a notification to the management service 120. In some cases, the notification can be communicated to the gateway management application 169, and the gateway management application 169 can transmit the notification to the management service 120. The management service 120 can forward the notification to a client device 109. Alternatively, the security process 153 can transmit the notification to the client device 109 directly. The management service 120 can generate a user interface that describes anomalies between the actual and expected behaviors, which can be rendered on a display of the management system 103 or a client device 109. The user interface can show a category and subcategories for the anomaly.

An administrator or other user can review the anomaly. If the anomaly is acceptable, the user can select a user interface element to indicating that the anomaly is acceptable. Otherwise, the user can select a user interface element indicating that the anomaly is unacceptable. The user can, through the user interface element, specify one or more of the remedial actions to perform.

In step 239, the management service 120 can transmit a command to the security process 153. In some cases, the command can be transmitted to the gateway management application 169, which can communicate or deliver the command to the security process 153. The command can be a command to perform a remedial action, or a command to verify the anomaly as acceptable. A command to perform a remedial action can include a specification of the particular remedial action(s) to perform. The security process 153 can perform the specified remedial action in response to receiving the command. The command to verify the anomaly as acceptable can include an updated baseline profile 155. The security process 153 can analyze the operational behaviors of the virtual machine 161 based on the updated baseline profile 155.

Figure 3:
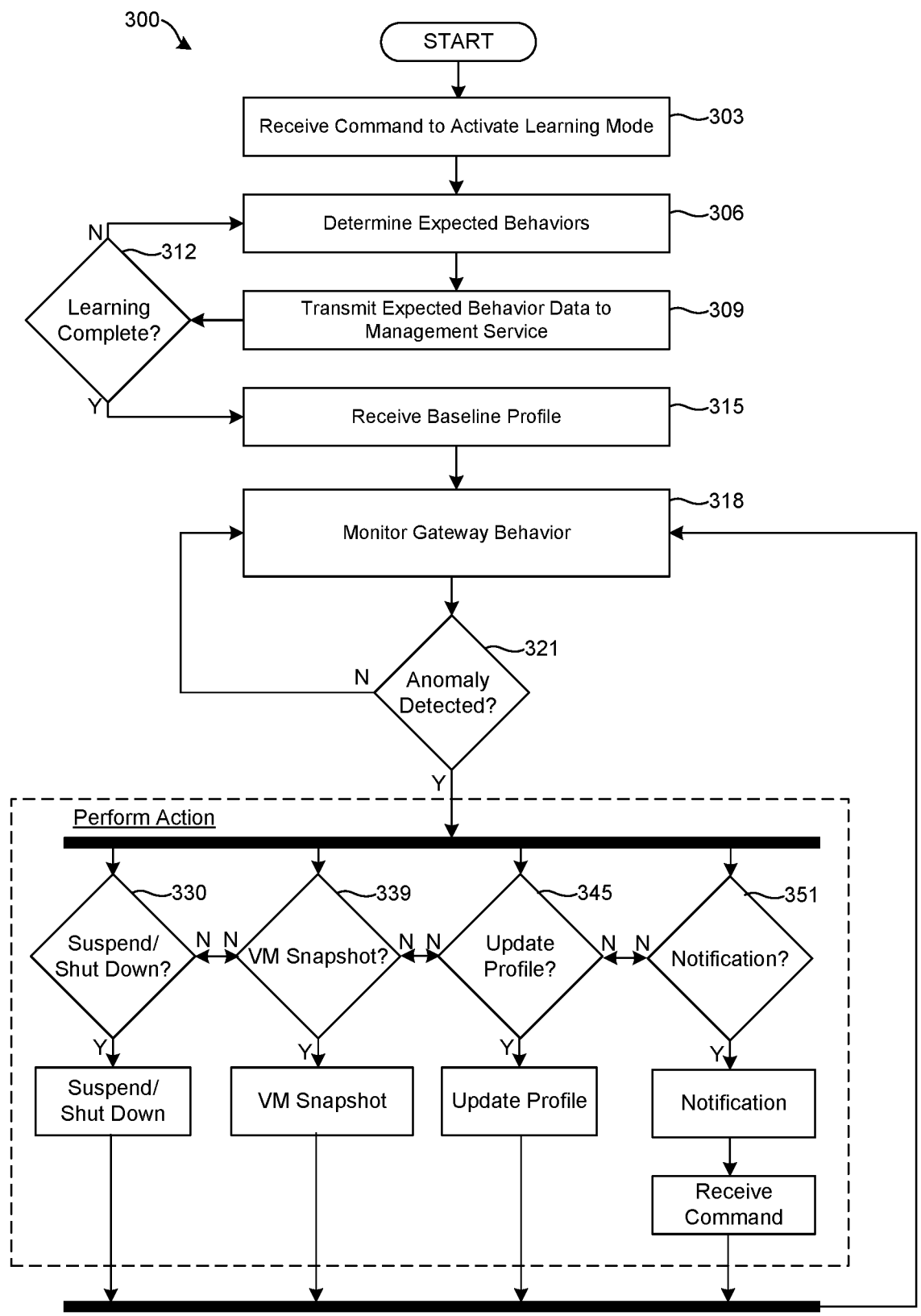
FIGS. 3 and 4 are example flowcharts illustrating functionality implemented by components of the networked environment.

With reference to FIG. 3, shown is an example flowchart 300 describing steps that can be performed by instructions executed by the gateway device 111. Generally, the flowchart 300 describes how the security process 153 can establish an acceptable baseline profile 155 for the virtual machine 161, monitor for an anomaly from the acceptable behaviors specified in the profile, and perform a remedial action based on the anomaly.

In step 303, the security process 153 can receive a command to activate a learning mode of the security process 153. The security process 153 can activate its learning mode to learn virtual machine 161 behaviors. The command can include a threshold period of time to activate a learning mode, after which learning mode can be completed. The threshold period of time can be selected to be an hour, week, month, or other appropriate time period. The threshold period can be determined based on an expected time for all behaviors of the gateway 111 and the IoT devices 113 to be expressed. Alternatively, learning mode can be activated until a command to initiate an enforcement mode is received.

In step 306, the security process 153 can determine expected behaviors of the gateway 111 in communication with the IoT devices 113. For example, the security process 153 can determine expected network behaviors and expected process behaviors. Expected network behaviors can be determined by intercepting or identifying data between the gateway 111 and IoT devices 113 and other network endpoints. The security process 153 can determine expected data rates based on the transferred data. The expected data rates can be generated for each process 165, each interface 157, each network endpoint, and each IoT device 113. The security process 153 can also determine a list of IoT devices 113. The security process 153 can determine a list of interfaces 157 used by the virtual machine 161, used by each process 165, or used by each IoT device 113. The security process 153 can also identify the protocols utilized by the virtual machine 161, used by each process 165, or used by each IoT device 113.

The security process 153 can also determine expected process behaviors. The security process 153 can determine process behaviors based on an examination of the virtual machine 161 and the processes 165 executed by the virtual machine 161. The expected process behaviors can also be filtered or organized according to IoT device 113. For example, expected process behaviors for an IoT device 113 can include a list of processes 165 and a count of the processes 165. For each process 165, process behaviors can include command lines utilized, network endpoints accessed, signatures utilized, publishers, and a hash of each process. The security process 153 can determine process behaviors according to virtual machine 161 or according to an associated IoT device 113. Each network endpoint can be identified according to a URL, URI, or IP address.

In step 309, the security process 153 can transmit behavior data 128 to the management service 120. The security process 153 can generate the behavior data 128 based on the expected process behaviors and expected network behaviors. The security process 153 can store the behavior data 128 and transmit it periodically to the management service 120. Alternatively, the security process 153 can stream the behavior data 128 to the management service 120 as it is intercepted or identified. Alternatively, the security process can store the behavior data 128 and generate a baseline profile 155 based on the behavior data 128 that is determined during the learning mode.

In step 312, the security process 153 can determine whether learning mode is complete. For example, where the command to activate learning mode includes a threshold period of time, the security process 153 can determine that learning is complete based on the threshold period of time having passed. Alternatively, the security process 153 can receive, from the management service 120, a command to initiate an enforcement mode or a command to deactivate learning mode. If learning is not completed, the security process 153 can continue to determine expected behaviors as indicated in step 306. If learning is completed, the security process 153 can move to step 315.

In step 315, the security process 153 can receive a baseline profile 155 from the management service 120. The baseline profile 155 can include all of the expected behaviors from the expected behavior data 128, or a subset of the expected behaviors that are verified to be acceptable. The baseline profile 155 can also be based on another virtual machine of a same type as the virtual machine 161. The management service 120 can maintain baseline profiles 155 for a variety of virtual machine groups or types. In some cases, the baseline profile 155 can be received, from the management service 120, in a command to install the baseline profile 155 to the gateway 111. The security process can also receive, from the management service 120, a command to activate an enforcement mode, which can include the baseline profile 155. Alternatively, the security process 153 can generate the baseline profile 155 based on the expected behaviors described in the behavior data 128.

In step 318, the management service 120 can monitor actual gateway 111 behaviors and compare to the baseline profile 155. The security process 153 can determine actual process behaviors based on an examination of the virtual machine 161 and the processes 165 executed by the virtual machine 161. The actual behaviors can be operational behaviors associated with the virtual machine 161 of the gateway 111 during the enforcement mode. Actual process behaviors for an IoT device 113 can include a list of processes 165 and a count of the processes 165. For each process 165, process behaviors can include command lines utilized, network endpoints accessed, signatures utilized, publishers, and a hash of each process. The security process 153 can also determine actual network behaviors based on the data transferred to and from the gateway 111. This can include intercepting or identifying data transferred to and from the gateway 111. The security process 153 can determine an actual data rate based on the transferred data. Multiple actual data rates can be determined. For example, an actual data rate can be determined for each process 165, each interface 157, and each IoT device 113. The security process 153 can also determine a list of IoT devices 113 based on IoT device 113 identifiers, which can be identified by analysis of the IoT data transferred to and from the gateway 111. The security process 153 can determine a list of interfaces 157 utilized by the virtual machine 161. The list of interfaces 157 can also be determined according to a process 165 that utilizes the list of interfaces 157. The security process 153 can intercept data transferred from the gateway 111 to identify the list of interfaces 157.

In step 321, security process 153 can detect an anomaly between the baseline profile 155 and the operational behavior of the virtual machine 161. The operational behavior can include the actual process behaviors for the virtual machine 161 and the actual network behaviors for the virtual machine 161. An anomaly can be based on any deviation identified from a comparison between the baseline profile 155 and the operational behaviors of the virtual machine 161 during the enforcement mode of the security process 153. The security process 153 can monitor the virtual machine 161 operational behavior, including actual process behaviors and actual network behaviors. These behaviors can be compared to the baseline profile 155 for the virtual machine of the gateway 111.

The security process 153 can detect an anomaly based on a process analysis that compares actual process behaviors from the behavior data 128 to expected process behaviors from the baseline profile 155. For example, the process analysis can determine an anomaly by comparing a list of actual processes 165 to a list of expected processes 165 from the baseline profile 155; an actual command line interface (CLI) argument for a particular process 165 to a list of expected command lines or CLI arguments for the process 165; an actual directory address of a particular process 165 to an expected directory address for the process 165; an actual signature for a particular process 165 to an expected signature for the process 165; or an actual publisher for the particular process 165 to an expected publisher for the process 165.

The process analysis can also determine an anomaly by comparing an actual hash of a particular process to an expected hash of the process. The security process 153 can generate a hash of the actual process 165 by inputting the process 165 into a hash cryptographic function. The security process 153 can compare the actual process hash from the monitored operational behavior of the virtual machine 161 to an expected process hash from the baseline profile 155. An anomaly in the hash can indicate that the code or content of the process 165 differs from the verified version of the process 165 from the baseline profile 155.

The security process 153 can detect an anomaly based on a network analysis of the virtual machine 161. The network analysis can determine an anomaly by comparing a list of actual interfaces 157 accessed by the virtual machine 161 to a list of expected interfaces 157 from the baseline profile 155. The network analysis can determine an anomaly by comparing an actual destination network address to a list of expected actual destination network addresses from the baseline profile 155. The actual and expected destination network addresses can be compared according to process 165, interface 157, or virtual machine 161. The network analysis can determine an anomaly by comparing an actual adapter to a list of expected adapters from the baseline profile 155. The actual and expected adapters can be compared according to process 165, interface 157, or virtual machine 161. The network analysis can also determine an anomaly by comparing an actual data transfer rate to an expected data transfer rate from the baseline profile 155. The actual and expected data transfer rates can be associated with a particular network interface, a particular process 165, a particular IoT device 113, a type of IoT device 113, or a total data transfer rate for the virtual machine 161.

If no anomaly is detected, the security process 153 can continue to monitor actual gateway 111 behaviors and compare to the baseline profile 155 in step 318. If an anomaly is detected, the security process 153 can continue to one or more of steps 330 through 351. In these steps, the security process 153 can perform a remedial action based on the anomaly. The remedial action can include one or more actions. The actions can include transmitting a notification to a management service 120, generating a snapshot of the virtual machine 161, shutting down the virtual machine 161, disabling an interface 157, suspending the virtual machine 161. While the examples discuss particular commands in association with particular behaviors, any of the behaviors described can be associated with any of the commands described.

In step 330, the security process 153 can determine whether to suspend the virtual machine 161 or shut down the virtual machine 161. The security process 153 can determine that the anomaly is associated with a command to shut down the virtual machine 161. The anomaly can be transmission of a data rate that is a threshold percentage over a particular data rate in the baseline profile 155, such as a data rate of the entire virtual machine 161, a particular process 165, a particular interface 157, or a particular external network address. An administrator may consider the anomaly to be at a level of concern such that shutting down the virtual machine 161 is a proper remedial action to perform. The baseline profile 155, table, file, or other data can indicate an association between the shut down command and the type of anomaly. Shutting down the virtual machine 161 can also be referred to as powering off the virtual machine 161.

In step 330, the security process 153 can also determine whether to disable an interface 157. A particular interface 157 can be associated with an anomaly, and the security process 153 can determine to shut down the interface 157 in response to the anomaly. The security process 153 can identify that a particular IoT device 113 is associated with an anomaly. The interface 157 can be an interface through which the gateway 111 communicates with the IoT device 113. The security process 153 can determine to shut down the interface 157 in order to prevent further communications with the IoT device 113. If the security process 153 determines to suspend or shut down an interface 157 or a virtual machine 161, then the security process 153 can perform that action and continue back to step 318.

In step 339, the security process 153 can determine whether to generate a snapshot of the virtual machine 161. The snapshot can preserve the state of the virtual machine 161. The state can be utilized by the management service 120 or an administrator can examine the virtual machine 161 to determine whether the anomalous behaviors are benign or malicious. The snapshot can save the current state of the virtual machine 161. The security process 153 can also start or resume a virtual machine 161 from the snapshot. The snapshot can be generated while a virtual machine 161 is powered on, powered off, or suspended. A snapshot can preserve the virtual machine 161, including a state of the disks associated with the virtual machine 161, contents of the memory or disks, as well as hardware and software settings of the virtual machine 161.

In step 345, the security process 153 can determine whether to update the baseline profile 155 based on behaviors that deviate from the baseline profile 155. For example, a data rate for an interface 157 or for the virtual machine 161 can increase. This can be an anomaly from the baseline profile 155. However, the security process 153 can determine that an appropriate action is to update the baseline profile 155 in response to the anomaly. For example, the security process 153 can determine that a list of IoT devices 113 includes a new IoT device 113, or that a count or number of the IoT devices 113 has increased. When a new IoT device 113 starts to communicate with the gateway 111, a rate of data transmission can increase. The security process 153 can determine an average data rate for each IoT device 113 by dividing the data rate (e.g, data rate for the virtual machine 161, or data rate for an interface 157) by the count of IoT devices 113. The security process 153 can also determine an average data rate for a particular type of IoT device 113. The security process 153 can add the average data rate to the expected data rate from the baseline profile 155 to generate an updated expected data rate. Although the actual data rate of the virtual machine 161 or interface 157 is unacceptable based on the original baseline profile 155, the security process 153 can ultimately determine that the actual data rate is acceptable based on the updated expected data rate.

In another example, an actual hash of a process 165 can be an anomaly from an expected hash of the process 165, a new process 165 can be included in a list of processes 165, or a new interface 157 can be included in a list of interfaces 157. However, the security process 153 can determine that a new IoT device 113 or a new type of IoT device 113 is associated with the anomaly. In some cases, the security process 153 can check a file, table, or other data in the data store 145, and the data can associate the type of IoT device 113 or the addition of an IoT device 113 with the type of anomaly. The security process 153 can also transmit a request to the management service 120 that identifies the IoT device 113 or a type of the IoT device 113. The management service 120 can respond with data that associates the type of IoT device 113 or the addition of the IoT device 113 with the type of anomaly. The security process 153 can update the baseline profile 155 if the anomaly is expected based on the data.

In step 351, the security process 153 can determine whether to transmit a notification. For example, the security process 153 can transmit a notification to the management service 120, or to a client device 109. For example, the security process 153 can transmit the status of the virtual machine 161 or the interface 157 to the management service 120. The notification can include a description of the anomaly. The notification can also include a suggested action or actions that have been automatically performed in response to the anomaly. The notification can also include a snapshot of the virtual machine 161.

In some cases, the security process 153 can receive a command from the management service 120 or the client device 109. The command can be transmitted in response to a selection of a user interface element or prompt generated by the notification. The prompt can include actions that can be performed in response to the anomaly. The command can be a command to perform one or more of the actions, such as power up or resume the virtual machine 161, update the baseline profile 155, generate a snapshot, power off or suspend the virtual machine 161, or activate the learning mode in response to the anomaly. The command can also be a command to accept the anomaly as acceptable behavior and update the baseline profile 155 to allow the anomaly.

Figure 4:
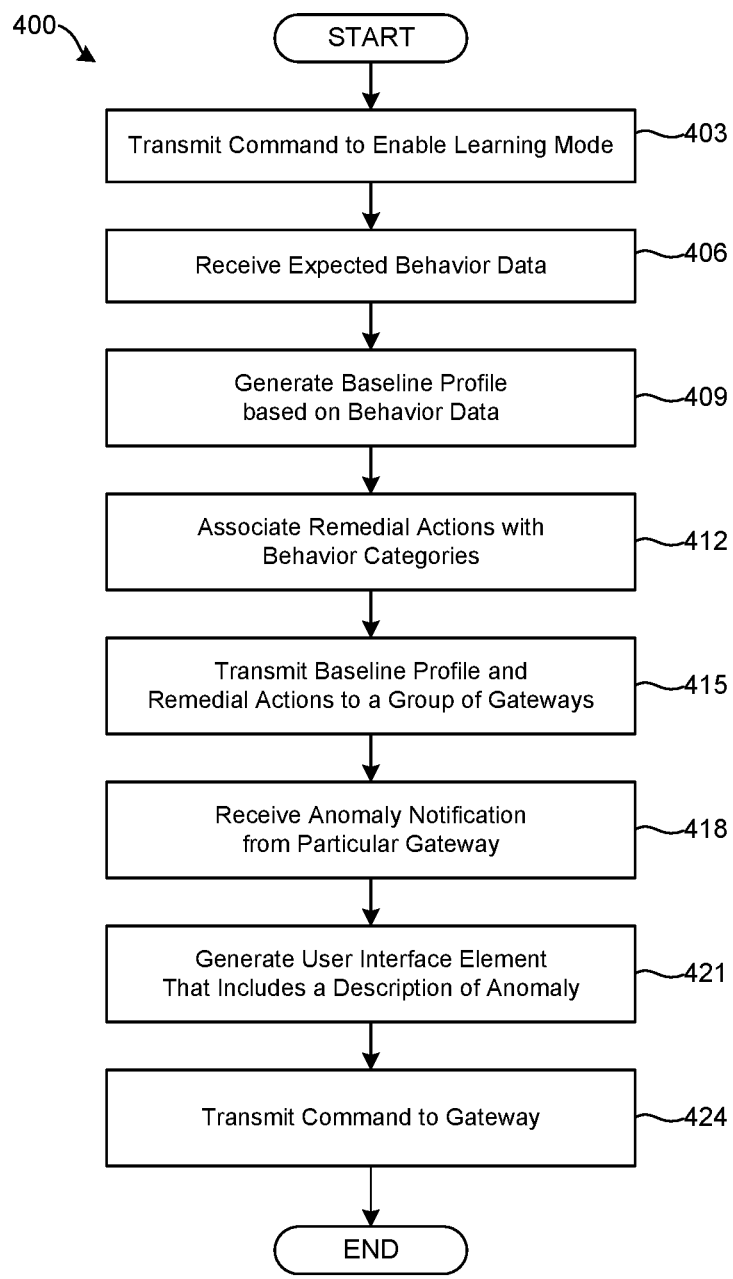

With reference to FIG. 4, shown is an example flowchart 400 describing steps that can be performed by instructions executed by the management service 120. Generally, the flowchart 400 describes how the management service can generate an acceptable baseline profile 155, cause the profile to be enforced on a gateway 111 by a security process 153, and respond to anomalies detected by the security process 153.

In step 403, the management service 120 can transmit a command to enable learning mode to the gateway 111. The gateway management application 169 or the security process 153 can receive the command to activate learning mode. If the gateway management application 169 receives the command, it can cause the security process 153 to activate learning mode. If the security process 153 receives the command, it can activate its learning mode to learn virtual machine 161 behaviors. The command can include a threshold period of time to activate a learning mode, after which learning mode can be completed. Alternatively, learning mode can be activated until a command to initiate an enforcement mode is received.

In step 406, the management service 120 can receive expected behavior data 128 from the gateway 111. The expected behavior data 128 can be received from the security process 153 or the gateway management application 169. The behavior data 128 can include expected network behaviors and expected process behaviors as described above. The behavior data 128 can be received in a data stream or multiple transmissions over a period of time, or in a single transmission from the gateway 111.

The behavior data 128 can include process behavior data and network data. Process behavior data for an IoT device 113 can be generated to include a list of processes associated with the IoT device 113, a count of the processes 165, command lines utilized, network endpoints accessed, signatures utilized, publishers, and a hash of each process associated with the IoT device 113. Process behavior data for a particular process can be generated to include command lines utilized, network endpoints accessed, signatures utilized, publishers, and a hash of the process 165. Network behavior data can include an interfaces list, a count of interfaces, a number or count of adapters, a list of the adapter names or titles, a quantity of data transferred, and a list of network addresses or destinations.

In step 409 the management service 120 can generate a baseline profile 155 based on the behavior data 128. The management service 120 can generate the baseline profile 155 based on the behavior data 128 transmitted to the management service 120 during the learning mode. The baseline profile 155 can include all of the behaviors of the virtual machine 161 from the behavior data 128, or a subset of the behaviors of the virtual machine 161 that are verified to be acceptable.

The management service 120 can generate a user interface that describes behaviors from the behavior data 128, which can be rendered on a display of the management system 103 or a client device 109. An administrator or other user can review the information in the user interface and verify all or a subset of the behaviors as acceptable. The management service 120 can generate a baseline profile 155 for the virtual machine 161 based on the behavior data 128 that is verified.

The baseline profile 155 can also include remedial actions to perform. A remedial action or actions can be associated with each category or subcategory of behavior in the baseline profile 155. For example, an expected network behavior can be a first category of behavior. An expected process behavior can be a second category of behavior. Further, a data rate for the virtual machine 161 can be a first subcategory of a network behavior category, while an anomaly in a data rate for a particular process 165 can be a second subcategory of the network behavior category. A specific process behavior can be a subcategory of a process behavior category.

In step 415, the management service 120 can transmit the baseline profile 155 and remedial actions to the gateway 111. The management service 120 can also transmit the baseline profile 155 and the remedial actions to a group of virtual machines that have a same type as the virtual machine 161 from which they were generated.

In step 418, the management service 120 can receive a notification from the gateway 111. The notification can include a description of the anomaly. The notification can also include a suggested action or action, or actions that have been automatically performed in response to the anomaly. The notification can also include a snapshot of the virtual machine 161.

In step 421, the management service 120 can generate a user interface that includes the description of the anomaly. The user interface can also include the actions that have been performed in response to the anomaly, and additional actions that can be performed in response to the anomaly. The user interface can also include a user interface element that, when selected, causes one or more of the additional actions to be performed.

In step 424, the management service 120 can transmit a command to the gateway 111. The command can be a command to perform one or more of the actions, such as power up or resume the virtual machine 161, update the baseline profile 155, generate a snapshot, power off or suspend the virtual machine 161, or activate the learning mode in response to the anomaly. The command can also be a command to permit the anomaly as acceptable behavior and update the baseline profile 155 to allow the anomaly.

Figure 5A:
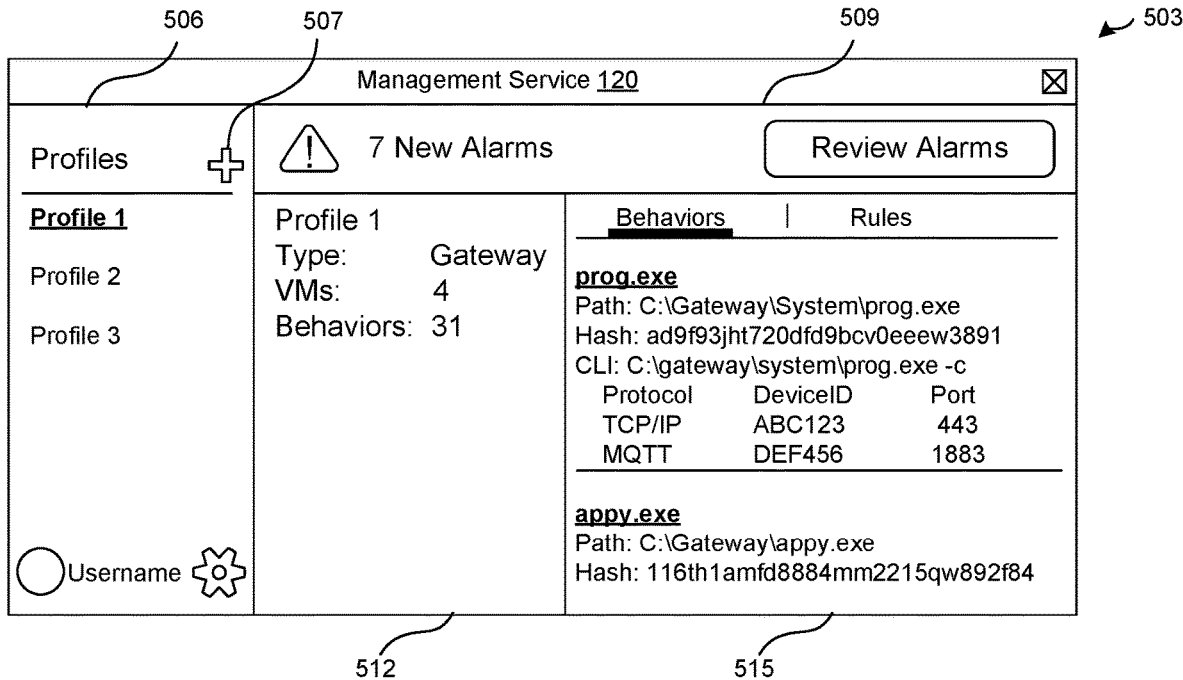
FIGS. 5A-B are drawings illustrating functionality implemented by components of the networked environment and rendered for display.

FIG. 5A shows an example of a user interface 503 generated by the management service 120 and rendered for display. The user interface 503 can include a panel or section 506 that includes a list of profiles. Multiple profiles can be shown for selection. For example, the panel 506 can show "Profile 1," "Profile 2," and "Profile 3," each of which can be an automatically assigned profile identifier, or a user-assigned profile identifier. The profiles can be baseline profiles 155, for example, for various virtual machines 161 or types of virtual machines 161. The panel 506 can also include a user interface element 507 that, when selected, causes an additional profile to be created. The user interface 503 can also include a panel or section 509. The panel 509 can indicate a number of new alarms. The new alarms can be based on anomalies that have not been reviewed and cleared by an administrator or other user. The panel 509 can also include a "review alarms" user interface element. When selected, this element can display a description of each anomaly detected.

The user interface 503 can include a panel 512. The panel 512 can show a description of Profile 1. The description can include a type associated with the baseline profile 155. The description can also include a number of virtual machines associated with the baseline profile 155. The virtual machines associated with the baseline profile 155 can each be on a separate gateway 111, or can be on a single gateway 111. The description can also include a number of behaviors and a number of rules that are defined for the baseline profile 155. The rules can define remedial actions for behaviors. In some cases, a default remedial action can be automatically assigned for all anomalies, until manually changed by an administrator or other user. The default remedial action can be any of the described remedial actions.

The user interface 503 can also include a panel 515. The panel 515 can show information that describes behavior data associated with the profile 1. For example, the panel 515 can describe a process "prog.exe," and a process "appy.exe." The panel 515 can include, for each process, a description of a path, a hash, a CLI argument, a list of protocols utilized, a list of IoT device 113 identifiers, and a list of interfaces 157 or ports.

Figure 5B:
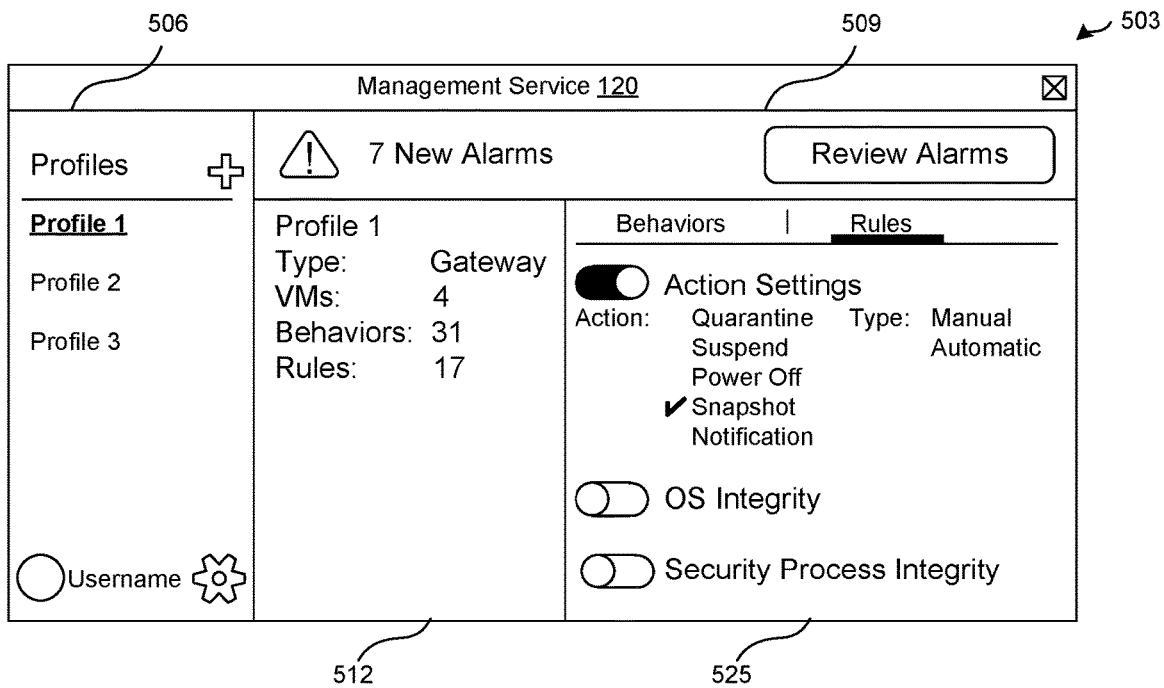

FIG. 5B shows another example of the user interface 503. The user interface 503 is updated to show a panel 525, which includes rules or action settings associated with a particular process. For example, a particular behavior for the process prog.exe can be selected from the panel 515, and the panel 525 can be generated in response to the selection. The panel 525 can include a "action settings" user interface element that, when selected, causes the management service 120 to enable the selected actions for the behavior. For example, the actions can include suspend, power off, snapshot, notification, quarantine, and other actions. The selected actions can be set to be performed automatically or manually. For example, if the actions are to be performed manually, the selected actions can be included in a user interface of notification as suggested actions or available actions to perform.

The panel 525 can also include an "OS Integrity" user interface element that, when selected, causes the management service 120 to enable operating system integrity settings for the security process 153 or hypervisor 151. For example, when enabled, the management service 120 can cause the security process 153 to enforce actions based on integrity of an operating system of the gateway 111. The operating system can refer to a guest operating system of the virtual machine 161, or a host operating system of the gateway 111. Actions can be performed in response to changes in files, settings, or states associated with the operating system.

The panel 525 can also include a "Security Process Integrity" user interface element that, when selected, causes the management service 120 to enable security process 165 integrity settings for the security process 153 or hypervisor 151. For example, when enabled, the management service 120 can cause the security process 153 to enforce actions based on integrity of the security process 153. Actions can be performed in response to changes in files, settings, or states associated with the security process 153.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface generated by a client application 136, management service 120, or another application can be rendered. In some examples, the user interface can be generated with user interface data provided by the management system 103. The client devices 109 can also include one or more input/output devices that can include, for example, a capacitive touchscreen or other type of touch input device, fingerprint reader, or keyboard.

Although the management service 120, client applications 136, and other services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions on an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system, comprising:
   at least one computing device comprising at least one processor; and
   at least one data store comprising instructions executed by the at least one processor, wherein the instructions, when executed by the at least one processor, cause the at least one computing device to at least:
   transmit, from a management service to a gateway security process executed in a gateway device, a baseline behavior profile for a gateway virtual machine executed by a gateway hypervisor of the gateway device;
   receive, by the management service from the gateway device, an anomaly notification comprising an indication that the gateway virtual machine is associated with an anomaly from the baseline behavior profile;
   generate, by the management service, a user interface comprising a description of the anomaly from the baseline behavior, wherein a selection of a user interface element indicates to permit the anomaly;
   generate, by the management service, an updated baseline behavior profile based on data describing the anomaly, wherein the updated baseline behavior profile permits the anomaly as an acceptable behavior; and transmit, by the management service to the gateway security process, a command to apply the updated baseline behavior profile.

2. The system of claim 1, wherein the anomaly notification specifies at least one remedial action that the gateway security process has performed to remediate the anomaly.

3. The system of claim 2, wherein the user interface further comprises an indication of the at least one remedial action that the gateway security process has performed to remediate the anomaly.

4. The system of claim 1, wherein the user interface further comprises a user interface element that specifies a management action to perform to remediate the anomaly.

5. The system of claim 4, wherein the instructions, when executed by the at least one processor, cause the at least one computing device to at least:
identify, by the management service, a selection of the user interface element that specifies the management action; and
transmit, by the management service to the gateway security process, a command to perform the management action.

6. The system of claim 1, wherein the gateway device orchestrates data communications for at least one Internet of Things (IoT) device.

7. The system of claim 6, wherein the gateway device identifies that the at least one IoT device violates a compliance rule based at least in part on status data received from the at least one IoT device.

8. A method performed by instructions executed by at least one computing device, the method comprising:
transmitting, from a management service to a gateway security process executed in a gateway device, a baseline behavior profile for a gateway virtual machine executed by a gateway hypervisor of the gateway device;
receiving, by the management service from the gateway device, an anomaly notification comprising an indication that the gateway virtual machine is associated with an anomaly from the baseline behavior profile;
generating, by the management service, a user interface comprising a description of the anomaly from the baseline behavior, wherein a user interface element indicates to permit the anomaly;
generating, by the management service, an updated baseline behavior profile based on data describing the anomaly, wherein the updated baseline behavior profile permits the anomaly as an acceptable behavior; and
transmitting, by the management service to the gateway security process, a command to apply the updated baseline behavior profile.

9. The method of claim 8, wherein the anomaly notification specifies at least one remedial action that the gateway security process has performed to remediate the anomaly.

10. The method of claim 9, wherein the user interface further comprises an indication of the at least one remedial action that the gateway security process has performed to remediate the anomaly.

11. The method of claim 8, further comprising:
identifying, through the user interface of the management service, a selection of a user interface element that indicates the anomaly is an acceptable behavior of the gateway virtual machine.

12. The method of claim 11, further comprising:
identifying, by the management service, a selection of the user interface element that specifies a management action; and
transmitting, by the management service to the gateway security process, a command to perform the management action.

13. The method of claim 8, wherein the gateway device orchestrates data communications for at least one Internet of Things (IoT) device.

14. The method of claim 13, wherein the gateway device identifies that the at least one IoT device violates a compliance rule based at least in part on status data received from the at least one IoT device.

15. A non-transitory computer-readable medium comprising instructions executed by at least one processor, wherein the instructions, when executed by the at least one processor, cause the at least one computing device to at least:
transmit, from a management service to a gateway security process executed in a gateway device, a baseline behavior profile for a gateway virtual machine executed by a gateway hypervisor of the gateway device;
receive, by the management service from the gateway device, an anomaly notification comprising an indication that the gateway virtual machine is associated with an anomaly from the baseline behavior profile; and
generate, by the management service, a user interface comprising a description of the anomaly from the baseline behavior, wherein a user interface element indicates to permit the anomaly;
generate, by the management service, an updated baseline behavior profile based on data describing the anomaly, wherein the updated baseline behavior profile permits the anomaly as an acceptable behavior; and
transmit, by the management service to the gateway security process, a command to apply the updated baseline behavior profile.

16. The non-transitory computer-readable medium of claim 15, wherein the anomaly notification specifies at least one remedial action that the gateway security process has performed to remediate the anomaly.

17. The non-transitory computer-readable medium of claim 16, wherein the user interface further comprises an indication of the at least one remedial action that the gateway security process has performed to remediate the anomaly.

18. The non-transitory computer-readable medium of claim 15, wherein the user interface further comprises a user interface element that specifies a management action to perform to remediate the anomaly.

19. The non-transitory computer-readable medium of claim 18, wherein the instructions, when executed by the at least one processor, cause the at least one computing device to at least:
identify, by the management service, a selection of the user interface element that specifies the management action; and
transmit, by the management service to the gateway security process, a command to perform the management action.

20. The non-transitory computer-readable medium of claim 15, wherein the gateway device orchestrates data communications for at least one Internet of Things (IoT) device.

* * * * *